US009769291B2

(12) United States Patent
Nistor et al.

(10) Patent No.: US 9,769,291 B2
(45) Date of Patent: Sep. 19, 2017

(54) METHODS, SYSTEMS, AND COMPUTER READABLE MEDIA FOR FACILITATING THE RESOLVING OF ENDPOINT HOSTNAMES IN TEST ENVIRONMENTS WITH FIREWALLS, NETWORK ADDRESS TRANSLATORS (NATS), OR CLOUDS

(71) Applicant: Ixia, Calabasas, CA (US)

(72) Inventors: Marius Pavel Nistor, Bucharest (RO); Mihail Florin Constantinescu, Bucharest (RO); Nicolas Ribault, Issy les Moulineaux (FR)

(73) Assignee: IXIA, Calabasas, CA (US)

( * ) Notice: Subject to any disclaimer, the term of this patent is extended or adjusted under 35 U.S.C. 154(b) by 192 days.

(21) Appl. No.: 14/619,041

(22) Filed: Feb. 10, 2015

(65) Prior Publication Data

US 2016/0234163 A1    Aug. 11, 2016

(30) Foreign Application Priority Data

Feb. 9, 2015    (RO) .............................. A/00086/2015

(51) Int. Cl.
*H04L 29/06*    (2006.01)
*H04L 29/12*    (2006.01)

(52) U.S. Cl.
CPC .............. *H04L 69/22* (2013.01); *H04L 61/15* (2013.01); *H04L 61/2567* (2013.01); *H04L 61/2514* (2013.01)

(58) Field of Classification Search
CPC ..... H04L 69/22; H04L 61/15; H04L 61/2514; H04L 61/2567

(Continued)

(56) References Cited

U.S. PATENT DOCUMENTS 8,065,418 B1 *  11/2011  Abuan .................. H04L 29/125
                                                  709/227
9,608,906 B2    3/2017  Constantinescu et al.

(Continued)

FOREIGN PATENT DOCUMENTS

WO     WO 03/069493 A1     8/2003
WO     WO 2016/130280 A1   8/2016

OTHER PUBLICATIONS

Non-Final Office Action for U.S. Appl. No. 14/572,746 (Aug. 24, 2016).
Non-Final Office Action for U.S. Appl. No. 14/619,039 (Jul. 13, 2016).

(Continued)

*Primary Examiner* — Tauqir Hussain
(74) *Attorney, Agent, or Firm* — Jenkins, Wilson, Taylor, & Hunt, P.A.

(57) ABSTRACT

Methods, systems, and computer readable media for facilitating the resolving of endpoint hostnames in test environments with firewalls, network address translators (NATs), or clouds is disclosed. According to one exemplary method, the method occurs at a registration server configured to operate in a public network. The method includes receiving, from a first endpoint, a packet including a payload containing a first address and a hostname associated with the first endpoint. The method also includes identifying a second address from a header of the packet. The method also includes initiating, using the second address, a connection to the first endpoint. The method also includes determining whether the connection is successful. The method further includes associating the hostname of the first endpoint with one of the first address and the second address based on results of the determination.

17 Claims, 8 Drawing Sheets

(58) Field of Classification Search
USPC .......................................................... 709/245
See application file for complete search history.

(56) References Cited

U.S. PATENT DOCUMENTS

| | | | |
|---|---|---|---|
| 2004/0240468 A1* | 12/2004 | Chin | H04L 29/12066 370/466 |
| 2005/0076235 A1 | 4/2005 | Ormazabal et al. | |
| 2005/0226194 A1* | 10/2005 | Fan | H04L 29/12009 370/338 |
| 2006/0062203 A1 | 3/2006 | Satapati | |
| 2007/0213966 A1 | 9/2007 | Noble | |
| 2008/0072312 A1* | 3/2008 | Takeyoshi | H04L 12/4641 726/15 |
| 2009/0040942 A1 | 2/2009 | Yang | |
| 2009/0077245 A1 | 3/2009 | Smelyansky et al. | |
| 2009/0154363 A1* | 6/2009 | Stephens | H04L 61/1517 370/241 |
| 2010/0183151 A1 | 7/2010 | Wing et al. | |
| 2011/0010413 A1* | 1/2011 | Christenson | H04L 29/12066 709/203 |
| 2011/0187864 A1 | 8/2011 | Snider | |
| 2012/0054491 A1* | 3/2012 | Tippett | H04L 9/3213 713/168 |
| 2012/0075439 A1 | 3/2012 | Gong et al. | |
| 2012/0078547 A1 | 3/2012 | Murdoch | |
| 2013/0272322 A1 | 10/2013 | Sagarwala et al. | |
| 2014/0310397 A1 | 10/2014 | Tseng et al. | |
| 2016/0156541 A1 | 6/2016 | Nistor et al. | |
| 2016/0173444 A1 | 6/2016 | Nistor | |
| 2016/0174178 A1 | 6/2016 | Nistor | |
| 2016/0234113 A1 | 8/2016 | Constantinescu et al. | |
| 2016/0248795 A1* | 8/2016 | Chien | H04L 63/1458 |

OTHER PUBLICATIONS

Commonly-assigned, co-pending U.S. Patent Application for "Methods, Systems, and Computer Readable Media for Identifying Network Locations Associated with Endpoints," (Unpublished, filed Feb. 10, 2015).

Commonly-assigned, co-pending U.S. Appl. No. 14/574,359 for "Methods, Systems, and Computer Readable Media for Initiating and Executing Performance Tests of a Private Network and/or Components Thereof," (Unpublished, filed Dec. 17, 2014).

Commonly-assigned, co-pending U.S. Appl. No. 14/572,746 for "Methods, Systems, and Computer Readable Media for Receiving a Clock Synchronization Message," (Unpublished, filed Dec. 16, 2014).

Commonly-assigned, co-pending U.S. Appl. No. 14/557,418 for "Methods, Systems, and Computer Readable Media for Receiving Test Configuration Information," (Unpublished, filed Dec. 1, 2014).

"UDP hole punching," Wikipedia, http://en.wikipedia.org/wiki/UDP_hole_punching, (Nov. 25, 2014).

Marius Pavel Nistor, "Application Mixes Add New Levels of Realism to IxChariot 8 Network Testing," Ixia, (Aug. 1, 2014).

Notification of Transmittal of the International Search Report and the Written Opinion of the International Searching Authority, or the Declaration for International Application No. PCT/US2016/013827 (May 2, 2016).

Non-Final Office Action for U.S. Appl. No. 14/572,746 (dated Mar. 7, 2017).

Non-Final Office Action for U.S. Appl. No. 14/574,359 (dated Jan. 17, 2017).

Notice of Allowance and Fee(s) Due for U.S. Appl. No. 14/619,039 (dated Nov. 7, 2016).

Final Office Action for U.S. Appl. No. 14/574,359 (dated Jul. 27, 2017).

Notice of Allowance and Fee(s) Due for U.S. Appl. No. 14/572,746 (dated Jul. 11, 2017).

Applicant Initiated Interview Summary for U.S. Appl. No. 14/572,746 (dated Jun. 22, 2017).

* cited by examiner

| ENDPOINT REGISTERED HOSTNAME | | |
|---|---|---|
| HOSTNAME | IP ADDRESS | NETWORK LOCATION |
| A | 121.16.0.16 | PUBLIC |
| B | 10.205.12.120 | PRIVATE |
| C | 74.20.0.16 | CLOUD |

METHODS, SYSTEMS, AND COMPUTER READABLE MEDIA FOR FACILITATING THE RESOLVING OF ENDPOINT HOSTNAMES IN TEST ENVIRONMENTS WITH FIREWALLS, NETWORK ADDRESS TRANSLATORS (NATS), OR CLOUDS

PRIORITY CLAIM

This application claims the benefit of Romanian Patent Application No. A/00086/2015, filed Feb. 9, 2015; the disclosure of which is incorporated herein by reference in its entirety.

TECHNICAL FIELD

The subject matter described herein relates to network testing of network devices. More specifically, the subject matter relates to methods, systems, and computer readable media for facilitating the resolving of endpoint hostnames in test environments with firewalls, network address translators (NATs), or clouds.

BACKGROUND

In network testing, to run traffic from host A to host B, it is necessary to find a route to host B. If the host B is identified by Internet protocol (IP), the standard network devices (e.g., routers, switches) handle the problem of finding a route to host B. But using IP addresses to identify hosts in tests creates dependency on the network configuration so using a name to identify the host is preferred. The host B name can usually be a hostname, domain name or fully qualified domain name so resolving of host B name is needed on host A.

Conventional solutions for resolving a host B name, is for the requesting entity or host A to query a domain name system (DNS) server to resolve domain name of host B hosted in enterprise, public, or semi-public networks. However, querying a DNS server may result in difficulties. In particular, besides the fact that DNS infrastructure is not always set on all machines in all environments, in a cloud-based network, for example, the hostname is different from fully qualified domain name assigned by the cloud infrastructure and external tools are needed first to get the fully qualified domain name. Additionally, if the host B is in private space, it may not even be possible to detect it from host A because it is not necessary that a domain name of host B be published by a local DNS server.

As a result, a need exists for methods, systems, and computer readable media for facilitating the resolving of endpoint hostnames in test environments with firewalls, network address translators (NATs), or clouds, which works in all the environments independent of a DNS infrastructure and which allows running tests between hosts, regardless of whether they are located in cloud, public, or enterprise networks.

SUMMARY

Methods, systems, and computer readable media for registering endpoint hostnames are disclosed. According to one exemplary method, the method occurs at a registration server configured to operate in a public network. The method includes receiving, from a first endpoint, a packet including a payload containing a first address and a hostname associated with the first endpoint. The method also includes identifying a second address from a header of the packet. The method also includes initiating, using the second address, a connection to the first endpoint. The method also includes determining whether the connection is successful. The method further includes associating the hostname of the first endpoint with one of the first address and the second address based on results of the determination.

According to one exemplary system, the system includes a registration server including one processor. The registration server is configured to operate in a public network. The registration server is also configured to receive, from a first endpoint, a packet including a payload containing a first address and a hostname associated with the first endpoint, identify a second address from a header of the packet, initiate, using the second address, a connection to the first endpoint, determine whether the connection is successful, and associate the hostname of the first endpoint with one of the first address and the second address based on results of the determination.

The subject matter described herein may be implemented in software in combination with hardware and/or firmware. For example, the subject matter described herein may be implemented in software executed by a processor. In one exemplary implementation, the subject matter described herein may be implemented using a non-transitory computer readable medium having stored thereon computer executable instructions that when executed by the processor of a computer control the computer to perform steps. Exemplary computer readable media suitable for implementing the subject matter described herein include non-transitory devices, such as disk memory devices, chip memory devices, programmable logic devices, field-programmable gate arrays, and application specific integrated circuits. In addition, a computer readable medium that implements the subject matter described herein may be located on a single device or computing platform or may be distributed across multiple devices or computing platforms.

As used herein, the term "node" refers to a physical computing platform including one or more processors, network interfaces, and memory.

As used herein, each of the terms "function" and "module" refer to hardware, firmware, or software in combination with hardware and/or firmware for implementing features described herein.

BRIEF DESCRIPTION OF THE DRAWINGS

The subject matter described herein will now be explained with reference to the accompanying drawings of which:

FIG. 5 is a table illustrating an exemplary registration data structure according to an embodiment of the subject matter described herein;

DETAILED DESCRIPTION

Figure 1:
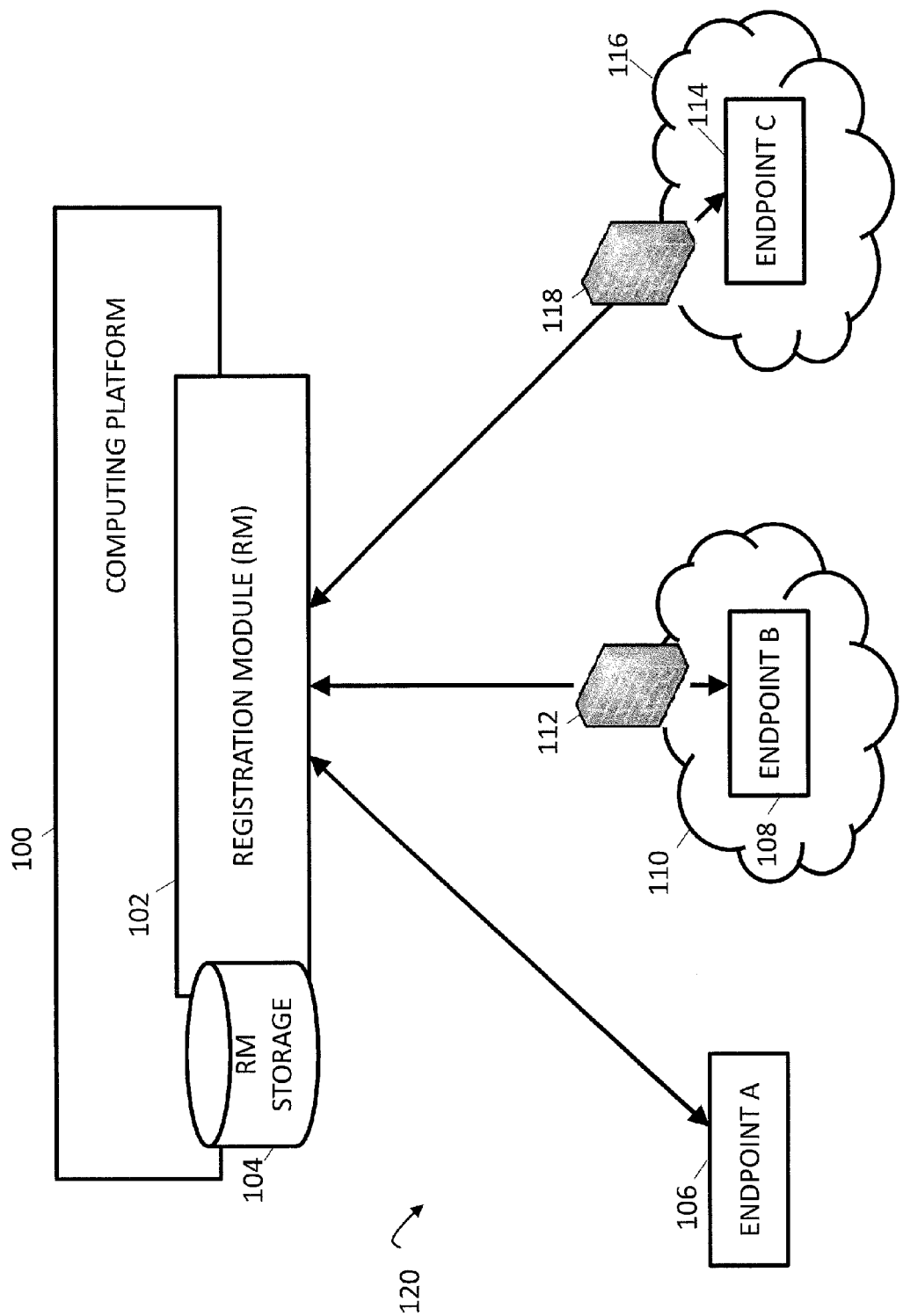
FIG. 1 is a diagram illustrating an exemplary computing platform for registering an endpoint hostname according to an embodiment of the subject matter described herein.

The subject matter described herein includes methods, systems, and computer readable media for facilitating the resolving of endpoint hostnames in test environments with firewalls, network address translators (NATs), or clouds. When preparing to test network endpoints, test operators typically need to resolve hostname of the endpoint to an Internet protocol (IP) address before providing test configuration information to the endpoints. Resolving a hostname of an endpoint is usually done by a requesting entity querying a DNS server, which results in the DNS server mapping a received hostname to its associated IP address using its internal table. However, where the internal table of a DNS server cannot resolve a domain or host name to its IP address (for example, when the endpoint is hosted in a private network and its hostname is not published), the DNS server must manually contact other DNS servers in the Internet or an intranet to resolve the hostname of host B.

In accordance with some aspects of the subject matter described herein, techniques for facilitating the resolving of endpoint hostnames in order to initiate test connections between various endpoints may include registering endpoint hostnames to a node configured to operate in a public network, for example, a public registration server (RS), so that a requesting entity may easily obtain a resolved endpoint hostname for an endpoint the requesting entity is interested in testing. For example, a registration server may be utilized to identify and transmit IP information (for example, IP address, host machine location, etc.) corresponding to a registered endpoint hostname to a requesting entity. The registration server may be separate from a DNS server.

Advantageously, in accordance with some aspects of the subject matter described herein, by utilizing a registration server to register endpoint hostnames and associated IP addresses, endpoint hostnames and their associated IP address may be provided to and received by a requesting entity independent of an existence of a DNS server, a dynamic host configuration protocol (DHCP) server, or other external tool, and regardless of the endpoint's host machine location; thus enabling test connections from one endpoint to another on a proper route.

Reference will now be made in detail to exemplary embodiments of the subject matter described herein, examples of which are illustrated in the accompanying drawings. Wherever possible, the same reference numbers will be used throughout the drawings to refer to the same or like parts.

Additional details regarding exemplary test environments and related functionality may be found in This application relates to U.S. patent application Ser. No. 14/557,418, entitled METHODS, SYSTEMS, AND COMPUTER READABLE MEDIA FOR RECEIVING TEST CONFIGURATION INFORMATION, filed on Dec. 1, 2014, and U.S. patent application Ser. No. 14/619,039, entitled METHODS, SYSTEMS, AND COMPUTER READABLE MEDIA FOR IDENTIFYING NETWORK LOCATIONS ASSOCIATED WITH ENDPOINTS, filed on even date herewith; the disclosures of which are hereby incorporated by reference in their entireties.

FIG. 1 is a diagram illustrating an exemplary computing platform 100 for registering a hostname of an endpoint according to an embodiment of the subject matter described herein. Referring to FIG. 1, a public network may include a computing platform 100.

Computing platform 100 may represent a network device, a network module, a node, or a system of devices, nodes, and/or modules. For example, computing platform 100 may be an endpoint operated in a public network (e.g., not located behind one or more security related devices, such as a firewall device or a NAT device). In some embodiments, computing platform 100 may be a single node or may include functionality distributed across multiple computing platforms or nodes.

Computing platform 100 may include or access a registration module (RM) 102. RM 102 may represent any suitable entity or entities (e.g., a computing platform, software executing on a processor, etc.) for performing one or more aspects associated with registering endpoint hostname information. Thus, RM 102 may include the functionality for interacting with other users, systems, endpoints, and/or nodes. For example, RM 102 may include one or more communications interfaces for receiving and sending various types of messages; such as IP messages, IP version 4 (IPv4) messages, IP version 6 (IPv6) messages, transmission control protocol (TCP) messages, stream control transmission protocol (SCTP) messages, real-time transport protocol (RTP) messages, or reliable data protocol (RDP) messages, general packet radio service (GPRS) tunneling protocol (GTP) messages, messages using another tunneling protocol, and/or other messages.

In some embodiments, computing platform 100 and/or RM 102 may include functionality associated with a registration server in a test environment. For example, a test environment may involve numerous endpoints (e.g., nodes and/or applications hosted on or executed by computing platforms) configured to send traffic for testing purposes. In this example, computing platform 100 and/or RM 102 may be configured to receive registration information periodically and/or aperiodically (e.g., dynamically) from the endpoints and to provide information about the endpoints to a test operator, e.g., via a test console.

In some embodiments, computing platform 100 and/or RM 102 may include functionality for automatically determining or identifying network locations associated with endpoints. For example, RM 102 may include network location detection logic and/or a related algorithm for determining whether an endpoint is reachable via associated IP address information. In this example, RM 102 may attempt to initiate or establish a connection (e.g., a TCP connection) with an endpoint and to infer a network location associated with the endpoint based, in part, on whether the connection was successful. Continuing with this example, RM 102 may use the outcome of the connection attempt and some other information (e.g., software-implemented logic that assumes that an endpoint behind a firewall in private network 110 will not be able to receive incoming connections from RM 102) to determine or identify a network location as public network 120, private network 110, or semi-public network 116.

In some embodiments, an endpoint located or hosted either in a public network, private network, or semi-public (e.g., cloud) network may initiate a connection with computing platform 100 and/or RM 102. For example, an endpoint A 106 located in a public network 120, public network 120 being a same or a different public network than the public network 120 that computing platform 100 and/or RM 102 are located in, may send a packet or message (e.g., a registration message or a TCP Keep-Alive message) to computing platform 100 and/or RM 102. Endpoint A 106 may insert in the packet or message a payload containing an IP address (e.g., an IPv4 or IPv6 address) associated with endpoint A 106 and a hostname associated with endpoint A 106. Such information may be preconfigured by a user or may be retrieved by endpoint A 106, although the specifics of this retrieval are outside the scope of the present subject matter. After receiving the packet or message, RM 102 may inspect the information in the payload of the packet or message to obtain the IP address (e.g., first IP address) and the endpoint hostname. RM 102 may also inspect a header of the packet or message and infer or identify source address information (e.g., a second IP address) associated with endpoint A 106 from the header.

In some embodiments, RM 102 may be configured to initiate a connection with endpoint A 106 using the header address information identified from the packet header of the packet or message. For example, RM 102 may send a connection request (e.g., a TCP SYN message) addressed to the second IP address associated with endpoint A 106 (e.g., a source IP address located in a packet header of a registration message sent by endpoint A). In this example, if endpoint A 106 receives and accepts the connection request, endpoint A 106 may send a connection response message (e.g., a TCP-ACK message) to RM 102. In response to a success of this connection, RM 102 may be configured to associate either the first IP address from the packet payload or the second IP address from the packet header with the hostname of endpoint A 106 and determine a network location (e.g., public network 120) of endpoint A 106.

Alternatively, the endpoint in question may not be hosted in a public network. Instead, the endpoint in question may be located in, for example, a private network or a cloud network. In FIG. 1, endpoint B 108 is hosted in in a private or enterprise network 110 that is located behind one or more security related devices 112, such as a firewall device or a network address translation (NAT) device. Security related device(s) 112 may represent any suitable entity or entities for monitoring and/or possibly affecting communications between entities within private network 110 and entities elsewhere, e.g., in public network 120 or semi-public network 116. For example, security related device(s) 112 may include a firewall device configured to block all incoming connection requests from public network 120 or semi-public network 116 to private network 110, but configured to allow outgoing connection requests from private network 110 to public network 120 or semi-public network 116. In another example, security related device(s) 112 may include a NAT device that performs NAT related functions by replacing private address information (e.g., a private IP address usable for routing packets within private network 110) in a packet header with public address information (e.g., a public IP address usable for routing packets within public network 120). For example, since computing platform 100 and/or RM 102 are located in public network 120, endpoint B 108 may prevent any connection initiation attempt (e.g., a connection request message) from RM 102. In response to a failure of the connection initiation attempt, RM 102 may be configured to associate the first IP address from the packet payload with the hostname of endpoint B 108 and determine a network location (e.g., private or enterprise network 110) of endpoint B 108.

Likewise, in FIG. 1, endpoint C 114 is hosted in a cloud service network 116 (e.g., Amazon Cloud Drive, Microsoft Azure, etc.) that is located behind one or more security devices 118. In some embodiments, security related device(s) 118 may include a NAT device that performs NAT related functions by replacing private address information (e.g., a private IP address usable for routing packets within semi-public network 116) in a packet header with public address information (e.g., a public IP address usable for routing packets within public network 120), e.g., such that incoming traffic is received by endpoints in semi-public network 116. For example, since computing platform 100 and/or RM 102 are located in a public network, endpoint C 114 may accept a connection initiation attempt (e.g., a connection request message) from RM 102. In response to a success of this connection, RM 102 may be configured to associate the second IP address from the packet header with the hostname of endpoint C 114 and determine a network location (e.g., cloud network 116) of endpoint C 114. Thus, independent of a DNS server, RM 102 may be able to associate a hostname of an endpoint with an IP address and network location of the endpoint (e.g., endpoints A-C), regardless of a location of said endpoint.

In some embodiments, computing platform 100 and/or RM 102 may be configured to register or store the associated IP address with the hostname of the endpoint received from communications with said endpoint. Additionally, computing platform 100 and/or RM 102 may be configured to also register or store a network location of the endpoint. That way, when a requesting entity contacts computing platform 100 and/or module 102, for resolving the endpoint hostname to Internet protocol (IP) address information for connection initiation purposes, such associated information is already stored in a storage device (e.g., RM storage, 104) integrated with or accessible by RM 102, computing platform 100, or modules therein. In some embodiments, RM storage 104 may be located at a node distinct from RM 102 and/or computing platform 100. For example, RM storage 104 may be associated with a storage device separate from computing platform 100.

RM storage 104 may represent any suitable entity (e.g., a non-transitory computer readable medium, embedded memory, or a memory device) for storing data associated with message flows, messages, test traffic, test results, statistics, and/or test related information. Exemplary data stored at RM storage 104 may include endpoint hostname information, endpoint network location information, address information, port information, proxy information, node identification information, test configuration information, test results, statistics, and/or other information.

In some embodiments, computing platform 100 and/or RM 102 may provide endpoint hostname and IP address information to enable a requesting entity, or a second endpoint or node, to instruct a first endpoint to initiate a test connection and/or session with a second endpoint. For example, a requesting entity may transmit to RM 102, in a test configuration message, a hostname of at least one endpoint that the requesting entity is interested in using in a test configuration. The test configuration message may include a request to computing platform 100 and/or RM 102 to resolve the endpoint hostname to the associated IP address that has previously been received, and subsequently stored, by RM 102. RM 102 may then include functionality for resolving the endpoint hostname to the associated IP address and transmitting said resolved hostname and associated IP address for the endpoint back to the requesting entity so that the requesting entity may configure a test connection or session between two endpoints. Alternatively, RM 102 may transmit said resolved hostname and associated IP address for the endpoint back to a second endpoint so that the second endpoint may configure a test connection between itself and the other endpoint.

In some embodiments, the requesting entity may use the resolved hostname and associated IP address for the endpoint for instructing either that endpoint or a second endpoint to initiate a test connection or session between one another, where each of the two endpoints may be hosted by a machine located in a different network (e.g., public, private, cloud). However, since test connection initiation is dependent on location of each involved endpoint (e.g., an endpoint located in a public or cloud network cannot initiate a test connection with a node located in a private network), the requesting entity may use the resolved hostname, associated IP address, and/or network location, to ascertain which endpoint should initiate the connection. Alternatively, where the requesting entity is a second endpoint, the second endpoint can initiate a test connection with the first endpoint. This aspect of the present subject matter will be explained in more detail below and in reference to FIG. 7.

It should be noted that computing platform 100 and/or RM 102 and its components and functionality described herein can constitute a special purpose computing device that improves the technological field of network testing by registering, at a node, endpoint hostnames and associated IP addresses, so that upon request by a requesting entity, the hostname may be resolved to the IP address of the endpoint and a connection may be initiated between that endpoint and a second endpoint, independent of a domain name server and regardless of a network location of either endpoint.

It will be appreciated that FIG. 1 is for illustrative purposes and that various nodes, their locations, and/or their functions described above in relation to FIG. 1 may be changed, altered, added, or removed. For example, some nodes and/or functions may be combined into a single entity.

Figure 2:
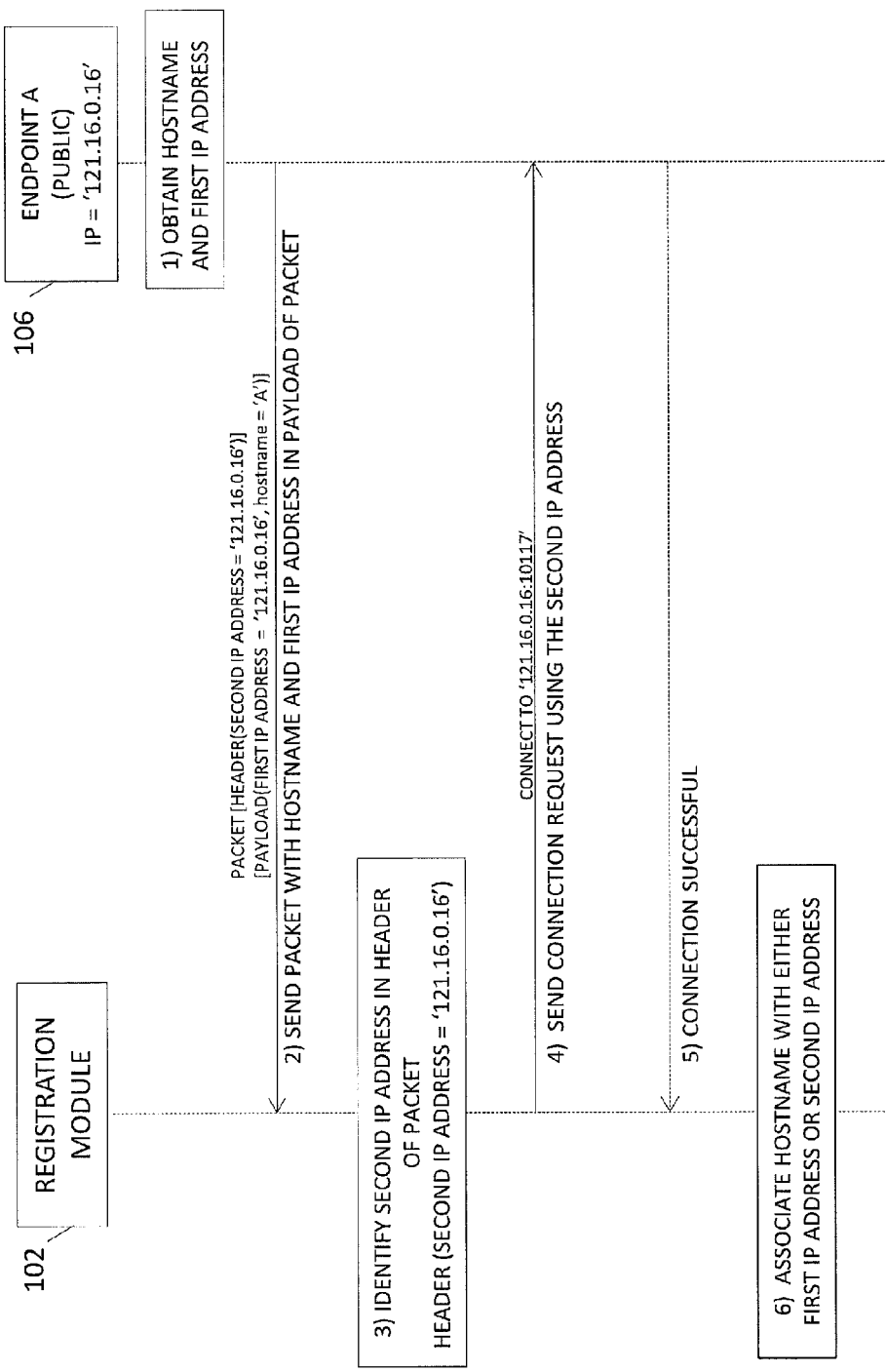
FIG. 2 is a diagram illustrating registering an endpoint hostname where the endpoint is hosted in a public network according to an embodiment of the subject matter described herein.
Figure 3:
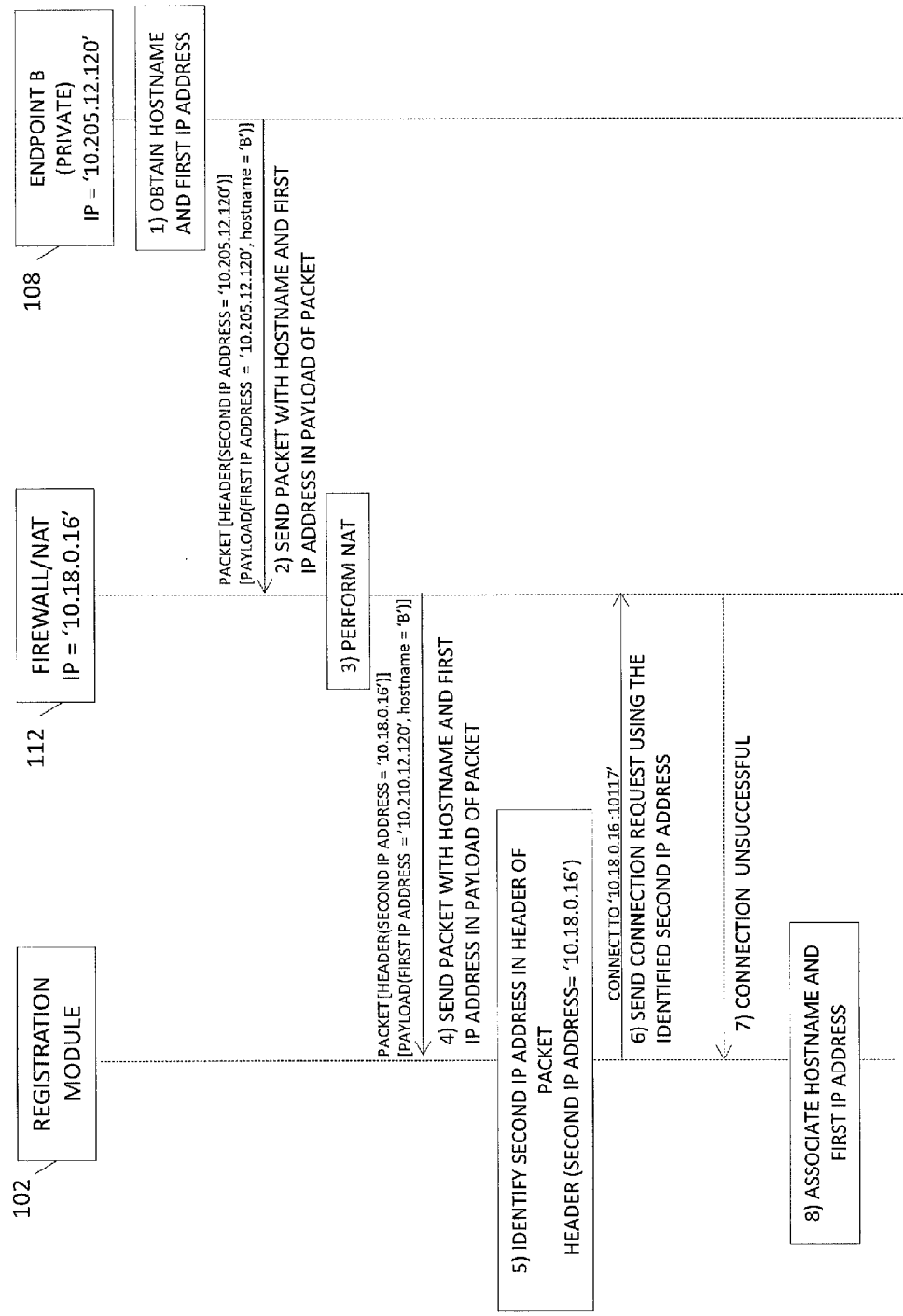
FIG. 3 is a diagram illustrating registering an endpoint hostname where the endpoint is hosted in a private network according to an embodiment of the subject matter described herein.
Figure 4:
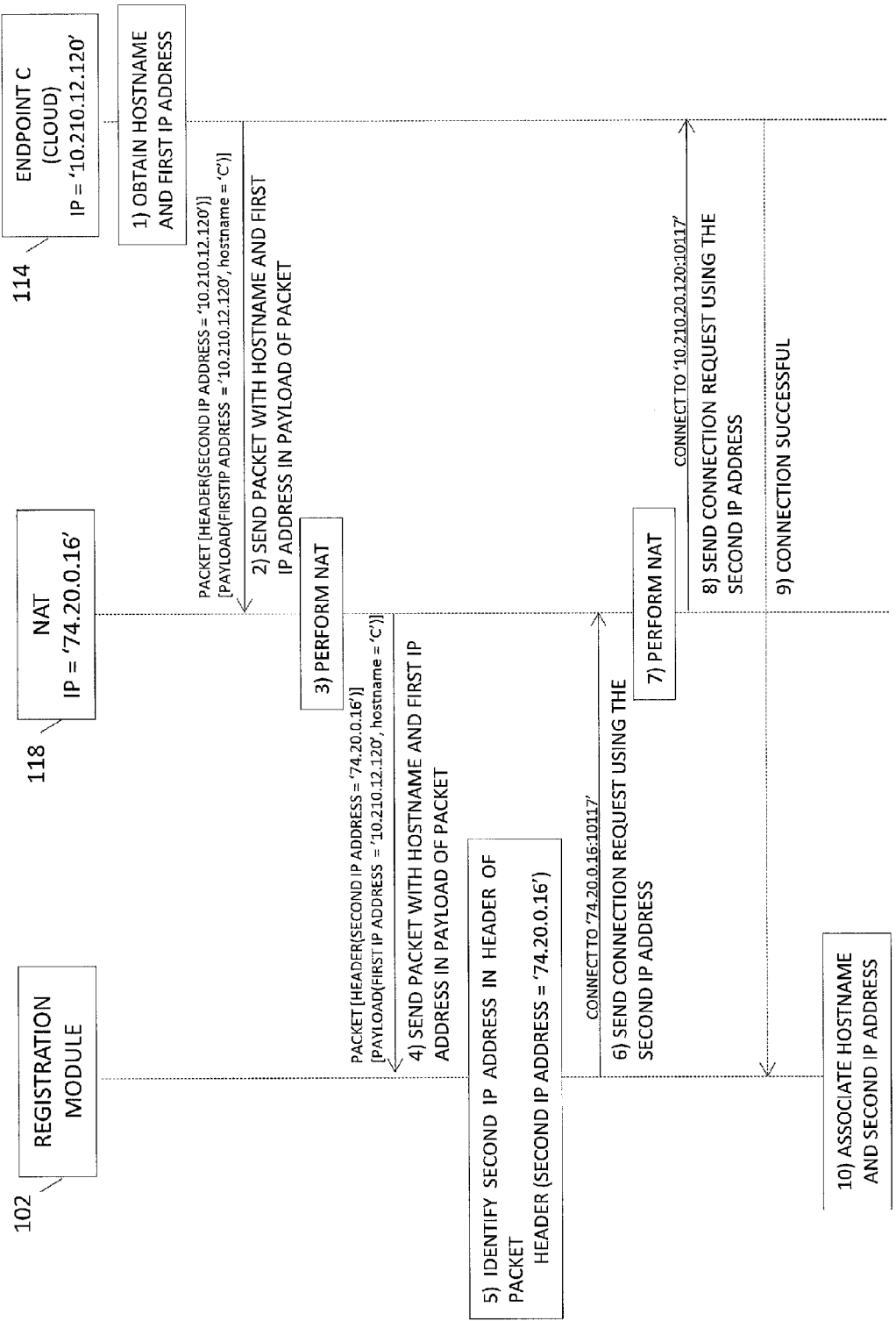
FIG. 4 is a diagram illustrating registering an endpoint hostname where the endpoint is hosted in a cloud network according to an embodiment of the subject matter described herein.

FIGS. 2-4 are message flow diagrams illustrating exemplary communications between a registration module (RM) 102 and an endpoint for registering endpoint hostnames according to an embodiment of the subject matter described herein. FIGS. 2-4 each illustrate an endpoint hosted in a different environment and techniques for associating an endpoint hostname with an IP address, regardless of the location of the endpoint.

Referring to FIG. 2, a diagram illustrating registering an endpoint hostname and IP address, where the endpoint is located in a public network, according to an embodiment of the present subject matter is described herein. In some embodiments, communication between an endpoint A 106 hosted in a public network 120 and a registration module (RM) 102, hosted in a public network 120 for registering or storing a hostname of endpoint A 106 with RM 102 is illustrated. In some embodiments, Endpoint A 106 may be hosted in a network different than RM 102. Endpoint A 106 may represent a node (e.g., a computing platform, module, or node) for receiving test configuration information and for generating test traffic.

In step 1, endpoint A 106 may obtain or otherwise determine a hostname and an IP address information (e.g., IPv4 or IPv6 address) for other nodes to communicate with endpoint A 106. IP address information may comprise the local IP address of the machine or node hosting endpoint A 106. Such information may be preconfigured by a user or may be retrieved by endpoint A 106. For example, endpoint A 106 may be configured to use an IPv4 address assigned by a network operator or a provisioning entity.

In step 2, endpoint A 106 may send a packet or message (e.g., a registration message, a UDP message, a TCP SYN message, or a TCP Keep-Alive message) containing address information to computing platform 100 and/or RM 102. For example, endpoint A 106 may include, in the packet or message, a payload containing a first IP address (e.g., a local IP address associated with endpoint A 106), as well as a hostname. Here, since endpoint A 106 is hosted in a public network the first IP address will be a public, local IP address. Referring to FIG. 2, the packet payload may include (IP='121.16.0.16', hostname='A'). In this example, endpoint A 106 may also include, in a header of the packet or message, a second IP address associated with endpoint A 106 as a source address parameter value. Here, since endpoint A 106 is hosted in a public network the second IP address will be a public, source IP address. Referring to FIG. 2, the packet header may include (IP='121.16.0.16').

In step 3, after receiving the packet or message, RM 102 may inspect the information in the payload of the packet or message to obtain the first IP address (e.g., a public, local IP address associated with endpoint A 106) and the hostname of the endpoint (e.g., 'A'). RM 102 may also inspect a header of the packet or message and infer or identify the second IP address (e.g., the public, source address parameter value associated with endpoint A 106) from the header. Referring to FIG. 2, for example, RM 102 may identify the header of the packet as including the second IP address (IP='121.16.0.16').

In step 4, after inferring or identifying the second IP address from the packet header, RM 102 may be configured to initiate a connection with endpoint A 106 using the second IP address identified from the packet header. For example, RM 102 may send a connection request (e.g., a TCP SYN message) addressed to the second IP address associated with endpoint A 106 (e.g., a public, source address parameter value located in a packet header of a registration message initiated by endpoint A 106).

In some embodiments, RM 102 may determine whether the second IP address from the header (e.g., public, source address parameter value associated with endpoint A 106) is identical to the first IP address (e.g., public, local IP address associated with endpoint A 106) from the payload. For example, if the payload IP address is identical to the header IP address then RM 102 may be configured to determine or infer that endpoint A 106 is associated with public network 120, e.g., without attempting to initiate a connection using received address information.

In step 5, the endpoint can respond to the initiation attempt. For example, endpoint A 106 may receive and accept the connection request and may send a connection response message (e.g., a TCP-ACK message) to RM 102. In response, RM 102 may be configured to determine or infer that endpoint A 106 is associated with public network 120.

In step 6, in response to a successful connection, RM 102 may be configured to associate the hostname of endpoint A 106 with either the first IP address from the packet payload or the second IP address from the packet header. For example, RM 102 may compare the first IP address from the packet payload with the second IP address from the packet header and determine that they are identical. Accordingly, in this example, since the first IP address and the second IP address are both '121.16.0.16', then RM 102 may determine that there is no firewall and/or NAT device and endpoint A 106 is located in a public network (e.g., 120).

In some embodiments, associating a hostname of endpoint A 106 with either the first IP address or the second IP address comprises storing or registering the associated IP address and hostname at a storage location e.g., RM storage 104. In addition, the network location of endpoint A 106 may also be stored in the storage location. For example, RM 102 may store a hostname of 'A', an IP address '121.16.0.16', and a network location of 'public' indicating that endpoint A 106 is located in public network 120 and/or that the endpoint is reachable via the associated IP address.

It will be appreciated that FIG. 2 is for illustrative purposes and that different and/or additional actions may be used. It will also be appreciated that various actions described herein may occur in a different order or sequence.

Referring to FIG. 3, a diagram illustrating registering an endpoint hostname and IP address, where the endpoint is located in a private network, according to an embodiment of the present subject matter is described herein. In some embodiments, communication between an endpoint B 108 hosted in a private network 110 and RM 102 hosted in public network 120 for registering or storing a hostname of endpoint B 108 with RM 102 is illustrated. In such embodiments, endpoint B 108 and computing platform 100 and/or RM 102 may attempt to communicate with one another, such that endpoint B 108 may attempt to register a hostname and IP address with computing platform 100 and/or RM 102 and computing platform 100 and/or RM 102 may attempt a connection initiation with endpoint B 108. However, since endpoint B 108 is hosted in a private network, security related device(s) 112 may be located between RM 102 and endpoint B 108 and may perform firewall and/or NAT related functions; thereby preventing a connection initiation attempt by computing platform 100 and/or RM 102.

In step 1, endpoint B 108 may obtain or otherwise determine a hostname and an IP address (e.g., IPv4 or IPv6 address) for other nodes to communicate with endpoint B 108. IP address information may comprise the local IP address of the machine or node hosting endpoint B 108. Such information may be preconfigured by a user or may be retrieved by endpoint B 108. For example, endpoint B 108 may be configured to use an IPv4 address assigned by a network operator or a provisioning entity.

In step 2, endpoint B 108 may send a packet or message (e.g., a registration message, a UDP message, a TCP SYN message, or a TCP Keep-Alive message) containing address information to computing platform 100 and/or RM 102. For example, endpoint B 108 may include, in the packet or message, a payload containing a first IP address (e.g., a local IP address associated with endpoint B 108), as well as a hostname. Here, since endpoint B 108 is hosted in a private network the first IP address will be a private, local IP address. Referring to FIG. 3, the packet payload may include (IP='10.205.12.120', hostname='B'). In this example, endpoint B 108 may also include, in a header of the packet or message, a second IP address associated with endpoint B 108 as a source address parameter value. Here, since endpoint B 108 is hosted in a private network the second IP address will be a private, source IP address. Referring to FIG. 3, the packet header may include (IP='10.205.12.120').

In step 3, security related device(s) 112 may perform NAT related functions associated with the packet or message sent from endpoint B 108. For example, prior to being received by RM 102, security related device(s) 112 may modify a header of a packet or message by replacing the second IP address (e.g., a private, source IP address associated with endpoint B 108) in the header with different address information (e.g., a public IP address associated with security related device(s) 112). Referring to FIG. 3, security related device(s) 112 may modify the header of the packet, such that the packet header may now include a second IP address that is a public IP address associated with security related device(s) 112, (IP='10.18.0.16').

In step 4, security related device(s) 112 may send the packet or message containing the modified header address information to computing platform 100 and/or RM 102. For example, the packet or message may include a payload containing a hostname and a first IP address associated with endpoint B 108 and a header containing a modified, second IP address associated with security related device(s) 112.

In step 5, after receiving the packet or message, RM 102 may inspect the information in the payload of the packet or message to obtain the first IP address (e.g., a private, local IP address associated with endpoint B 108) and the hostname of the endpoint (e.g., 'B'). RM 102 may also inspect a header of the packet or message and infer or identify a modified, second IP address (e.g., a public IP address associated with security related device(s) 112) from the header. Referring to FIG. 3, for example, RM 102 may identify the header of the packet or message as including the modified, second IP address (IP='10.18.0.16').

In step 6, after inferring or identifying the second IP address information, RM 102 may be configured to initiate a connection with endpoint B 108 using the modified, second IP address identified from a packet header. For example, RM 102 may send a connection request (e.g., a TCP SYN message) addressed to the modified, second IP address (e.g., public IP address associated with security related device(s) 112).

In some embodiments, e.g., if computing platform 100 and/or RM 102 are located in a public network 120 or semi-public network 116, security related device(s) 112 may receive a connection request from computing platform 100 and/or RM 102 and may discard or otherwise prevent communication request from being received by endpoint B 108. Instead, a connection request error message may be sent back to RM 102, a timeout may occur, or another indication may be received or determined for indicating that the connection was unsuccessful.

In step 7, RM 102 may receive an indication of an unsuccessful connection with endpoint B 108 or may otherwise determine that a connection request was unsuccessful. In response, RM 102 may be configured to determine or infer that endpoint B 108 is associated with private network 110.

In step 8, in response to an unsuccessful connection attempt, RM 102 may be configured to associate the hostname of endpoint B 108 with the first IP address. For example, since RM 102 may determine that endpoint B 108 is hosted in a private network, RM 102 may store the first IP address (e.g., the private, local IP address associated with endpoint B 108).

In some embodiments, associating a hostname of endpoint B 108 with the first IP address comprises storing the associated IP address and hostname at a storage location e.g., RM storage 104. In addition, the network location of endpoint B 108 may also be stored in the storage location. For example, RM 102 may store a hostname of 'B', an IP address '10.205.12.120', and a network location of 'private' indicating that endpoint B 108 is located in private network 110 and/or that the endpoint is reachable only from other endpoints hosted in the same private network. Analogously, in this example, endpoint B 108 is unreachable via the associated IP address by other endpoints hosted in public or cloud networks.

It will be appreciated that FIG. 3 is for illustrative purposes and that different and/or additional actions may be used. It will also be appreciated that various actions described herein may occur in a different order or sequence.

Referring to FIG. 4, a diagram illustrating registering an endpoint hostname and IP address, where the endpoint is located in a semi-public or cloud network, according to an embodiment of the present subject matter is described herein. In some embodiments, communication between an endpoint C 114 hosted in a semi-public network 116 and RM 102 hosted in public network 120 for registering or storing a hostname of endpoint C 114 with RM 102 is illustrated. In such embodiments, endpoint C 114 and computing platform 100 and/or RM 102 may attempt to communicate with one another, such that endpoint C 114 may attempt to register a hostname and IP address with computing platform 100 and/or RM 102 and computing platform 100 and/or RM 102 may attempt a connection initiation with endpoint C 114. However, since endpoint C 114 is hosted in a semi-public network, a security related device(s) 118 may be located between RM 102 and endpoint C 114 and may perform firewall and/or NAT related functions; which may or may not prevent a connection initiation attempt by computing platform 100 and/or RM 102.

In step 1, endpoint C 114 may obtain or otherwise determine a hostname and an IP address (e.g., IPv4 or IPv6 address) for other nodes to communicate with endpoint C 114. IP address information may comprise the local IP address of the machine or node hosting endpoint C 114. Such information may be preconfigured by a user or may be retrieved by endpoint C 114. For example, endpoint C 114 may be configured to use an IPv4 address assigned by a network operator or a provisioning entity.

In step 2, endpoint C 114 may send a packet or message (e.g., a registration message, a UDP message, a TCP SYN message, or a TCP Keep-Alive message) containing address information to computing platform 100 and/or RM 102. For example, endpoint C 114 may include, in the packet or message, a payload containing a first IP address (e.g., a local IP address associated with endpoint C 114), as well as a hostname. Here, since endpoint C 114 is hosted in a semi-public network the first IP address will be a private, local IP address. Referring to FIG. 4, the packet payload may include (IP='10.210.12.120', hostname='C'). In this example, endpoint C 114 may also include, in a header of the packet or message, a second IP address associated with endpoint C 114 as a source address parameter value. Here, since endpoint C 114 is hosted in a semi-public or cloud network the second IP address will be a private, source IP address. Referring to FIG. 4, the packet header may include (IP='10.210.12.120').

In step 3, security related device(s) 118 may perform NAT related functions associated with the packet or message sent from endpoint C 114. For example, prior to being received by RM 102, security related device(s) 118 may modify a header of a packet or message by replacing the second IP address (e.g., a private, source IP address associated with endpoint C 114) in the header with different address information (e.g., a public IP address associated with security related device(s) 118). Referring to FIG. 4, security related device(s) 118 may modify the header of the packet, such that the packet header may now include a second IP address that is a public IP address associated with security related device(s) 118, (IP='74.20.0.16').

In step 4, security related device(s) 118 may send the packet or message containing modified header address information to computing platform 100 and/or RM 102. For example, the packet or message may include a payload containing a hostname and a first IP address associated with endpoint C 114 and a header containing a modified, second IP address associated with security related device(s) 118.

In step 5, after receiving the packet or message, RM 102 may inspect the information in the payload of the packet or message to obtain the first IP address (e.g., a private, local IP address associated with endpoint C 114) and the hostname of the endpoint (e.g., 'C'). RM 102 may also inspect a header of the packet or message and infer or identify a modified, second IP address (e.g., a public IP address associated with security related device(s) 118) from the header. Referring to FIG. 4, for example, RM 102 may identify the header of the packet or message as including the modified, second IP address (IP='74.20.0.16').

In step 6, after inferring or identifying the second IP address information, RM 102 may be configured to initiate a connection with endpoint C 114 using the modified, second IP address identified from a packet header. For example, RM 102 may send a connection request (e.g., a TCP SYN message) addressed to the modified, second IP address (e.g., public IP address associated with security related device(s) 118).

In step 7, security related device(s) 118 may perform NAT related functions associated with the packet or message sent from endpoint C 114. For example, prior to being received by RM 102, security related device(s) 118 may modify a header of a packet or message by replacing the modified, second IP address (e.g., a public IP address associated with security related device(s) 118) in the header with a private, source IP address (e.g., a private IP address associated with endpoint C 114) stored at security related device(s) 118. In this example, security device 118 may modify the packet header by replacing the modified, second IP address (IP='74.20.0.16') with the private, source IP address (IP='10.210.20.120').

In step 8, security related device(s) 118 may send the packet or message containing a modified header address (e.g., the private, source IP address associated with endpoint C 114) to endpoint C 114. For example, the packet or message may include a header containing the second IP address (IP='10.210.20.120').

In some embodiments, the connection request may be received by endpoint C 114 and endpoint C 114 may respond by sending a connection request acknowledgement or other indication to computing platform 100 and/or RM 102 (e.g., via security related device(s) 118).

In step 9, RM 102 may receive an indication of a successful connection with endpoint C 114 or may otherwise determine that a connection request was unsuccessful. In response, RM 102 may be configured to determine or infer that endpoint C 114 is associated with semi-public network 116.

In step 10, in response to a successful connection with endpoint C 114, RM 102 may be configured to associate the hostname of endpoint C 114 with the second IP address associated with the security related device(s) 118. For example, since RM 102 may determine that endpoint C 114 is hosted in a semi-public or cloud network, RM 102 may store the second IP address (e.g., the public IP address associated with security related device(s) 118).

In some embodiments, associating a hostname of endpoint C 114 with the second IP address comprises storing the associated IP address and hostname at a storage location e.g., RM storage 104. In addition, the network location of endpoint C 114 may also be stored in the storage location. For example, RM 102 may store a hostname of 'C', an IP address '74.20.0.16', and a network location of 'semi-public' or 'cloud' indicating that endpoint C 114 is located in a cloud network network 116 and/or that the endpoint is only reachable through the public IP address associated with the security related device(s) 118.

It will be appreciated that FIG. 4 is for illustrative purposes and that different and/or additional actions may be used. It will also be appreciated that various actions described herein may occur in a different order or sequence.

Referring to FIG. 5, endpoint registered hostname data structure 500 may be any suitable data structure for registering and/or storing endpoint hostnames, associated IP addresses and network locations. For example, endpoint registered hostname data structure 500 may be stored in a data table. More particularly, each endpoint hostname may indicate the IP address associated with the endpoint and the network location of the endpoint determined by RM 102 initiating a connection with the endpoint and subsequently associating either the payload IP address (e.g., first address) or the header IP address (e.g., second address) with the hostname. In some embodiments, the 'hostname' of the endpoint is preconfigured by a user or may be retrieved by endpoint in a manner outside the scope of this subject matter. For example, a first endpoint is listed in a first line of data structure 500 with its obtained hostname 'A', which references endpoint A 106 (e.g., FIGS. 1 and 2). In other examples, second and third endpoints are listed in a second and third line, respectively, of data structure 500. The second endpoint is listed with its obtained hostname 'B', which references endpoint B 108 (e.g., FIGS. 1 and 3), while the third endpoint is listed with its obtained hostname 'C', which references endpoint C 114 (e.g., FIGS. 1 and 4).

In some embodiments, the 'IP address' of the endpoint is either the payload IP address or the header IP address that has been associated by RM 102 and/or computing platform 100 with the endpoint hostname. The IP address that is to be associated with the endpoint is determined based on a success of a connection initiation attempt by RM 102 to the endpoint. Where the connection is not successful, RM 102 associates the payload IP address (e.g., first address) with the hostname of the endpoint. For example, the endpoint with hostname 'B' is listed with an IP address of '10.205.12.120' associated with its hostname in data structure 500. Conversely, where the connection is successful, RM 102 has to further compare the payload IP address and the header IP address in order to decide which IP address should be associated (and subsequently stored in data structure 500) with the hostname. For example, the endpoint with hostname 'A' is listed with an IP address of '121.16.0.16', while the endpoint with hostname 'C' is listed with an IP address of '74.20.0.16'. While an entity requesting RM 102 to resolve an endpoint hostname to an IP address need not know which IP address is stored in data structure 500, i.e., whether it is the payload IP address or the header IP address, such information may be helpful in combination with knowledge of the success/non-success of the connection initiation attempt with the endpoint determining a network location of the endpoint.

In some embodiments, 'network location' of the endpoint refers to a network location (i.e., public network, private network, or semi-public network) of the machine or node hosting the endpoint. A requesting entity may desire such information when attempting to configure a test connection between two endpoints. The network location of an endpoint can be determined based on which IP address is associated with the endpoint hostname and the success of the connection initiated by RM 102 to the endpoint in question. For example, endpoint A 106 is listed on the first line of data structure 500 with the associated IP address of '121.16.0.16'. In view of the ladder diagram illustrated in FIG. 2, the payload IP address communicated to RM 102 in a payload of the packet transmitted by endpoint A 106 is '121.16.0.16' (i.e., step 2, FIG. 2) and the header IP address inferred by the RM 102 from the header of the packet transmitted by endpoint A 106 is '121.16.0.16' (i.e., step 3, FIG. 2). Thus, the payload IP address (e.g., first address) and the header IP address (e.g., second address) are the same. Additionally, since the connection initiation attempt from RM 102 to endpoint A 106 was successful (i.e., step 5, FIG. 2), endpoint A 106 can be identified as being hosted in a public network (e.g., 120, FIG. 1) because the connection attempt to endpoint A 106 using the source IP address was not rejected by any type of security device (e.g., firewall or NAT device).

In another example, endpoint B 108 is listed on the second line of data structure 500 with the associated IP address of '10.205.12.120'. In view of the ladder diagram illustrated in FIG. 3, the payload IP address communicated to RM 102 in a payload of the packet transmitted by endpoint B 108 is '10.205.12.120' (i.e., steps 2-4, FIG. 3) and the header IP address inferred by the RM 102 from the header of the packet transmitted by endpoint B 108 is '10.18.0.16' (i.e., step 5, FIG. 3). Additionally, the connection initiation attempt from RM 102 to endpoint B 108 was unsuccessful (i.e., step 7, FIG. 3). As a result, endpoint B 108 can be identified as being hosted in a private network (e.g., 110, FIG. 1) because the connection attempt to endpoint B 108 using the second IP address (e.g., public IP address associated with security device 112) was rejected by a security device 112 (e.g., a firewall or NAT device).

In another example, endpoint C 114 is listed on the third line of data structure 500 with the associated IP address of '74.20.0.16'. In view of the ladder diagram illustrated in FIG. 4, the payload IP address communicated to RM 102 in a payload of the packet transmitted by endpoint C 114 is '10.210.12.120' (i.e., steps 2-4, FIG. 4) and the header IP address inferred by the RM 102 from the header of the packet transmitted by endpoint C 114 is '74.20.0.16' (i.e., step 5, FIG. 4). Additionally, since the connection initiation attempt from RM 102 to endpoint C 114 was successful (i.e., step 9, FIG. 4), endpoint C 114 can be identified as being hosted in a semipublic or cloud network (e.g., 116, FIG. 1) because the connection attempt to endpoint C 114 using the second IP address (e.g., public IP address associated with security device 118) was accepted, despite the presence of a security device 118 (e.g., a firewall or NAT device).

Figure 6:
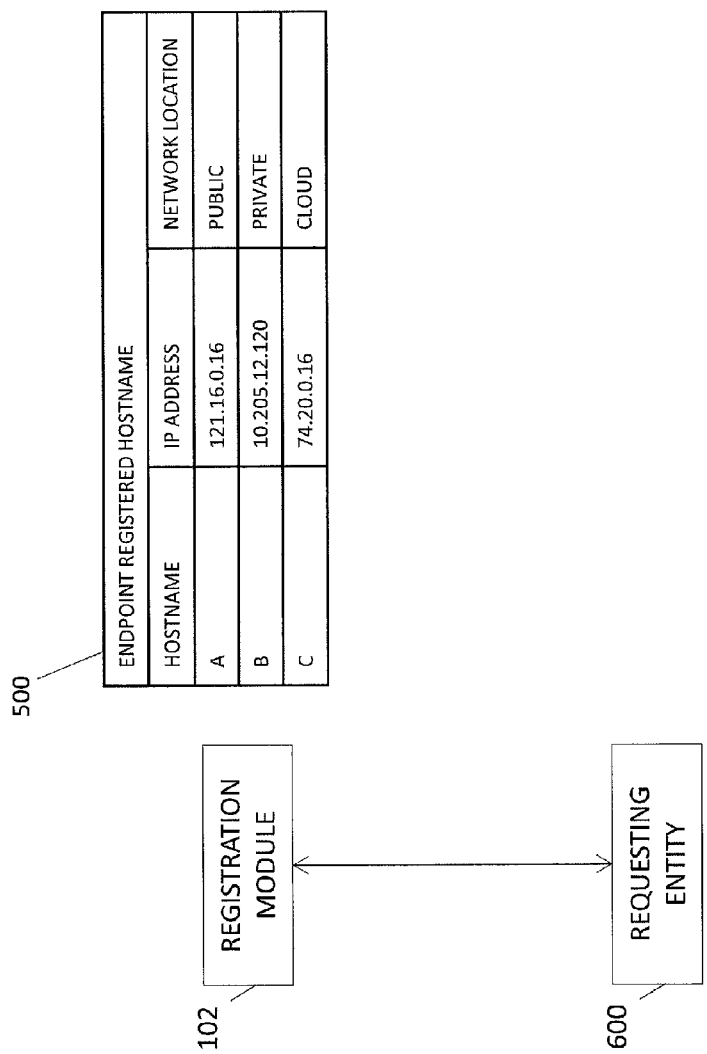
FIG. 6 is a diagram illustrating resolving an endpoint hostname using the registration data structure of FIG. 5 according to an embodiment of the subject matter described herein.

In some embodiments, the data stored in data structure 500 may be accessible from RM storage 104 or from another storage device that is integrated with and/or accessible by RM 102, computing platform 100, or modules therein by a requesting entity. Referring to FIG. 6, a diagram illustrating endpoint hostname resolution according to an embodiment of the subject matter is described herein. For example, registration module (RM) 102 may receive from a requesting entity 600 a request message containing a request to resolve the hostname of an endpoint to its associated address. In some aspects, in response to receiving a request to resolve the hostname of an endpoint to its associated address, RM 102 may obtain the IP address, as well as network location information of the endpoint, from data structure 500 and may transmit the resolved hostname and IP address information in a response message back to requesting entity 600.

In some embodiments, requesting entity 600 may receive the resolved hostname of the endpoint and the associated IP address, as well as a network location of the endpoint from RM 102. In this example, requesting entity 600 may use the resolved endpoint hostname, associated IP address, and/or network location to instruct either the endpoint in question or a second endpoint to initiate a test connection between itself and the other endpoint. The endpoint instructed to initiate the test connection depends on the network location of each endpoint in the test configuration, as described in more detail below.

Figure 7:
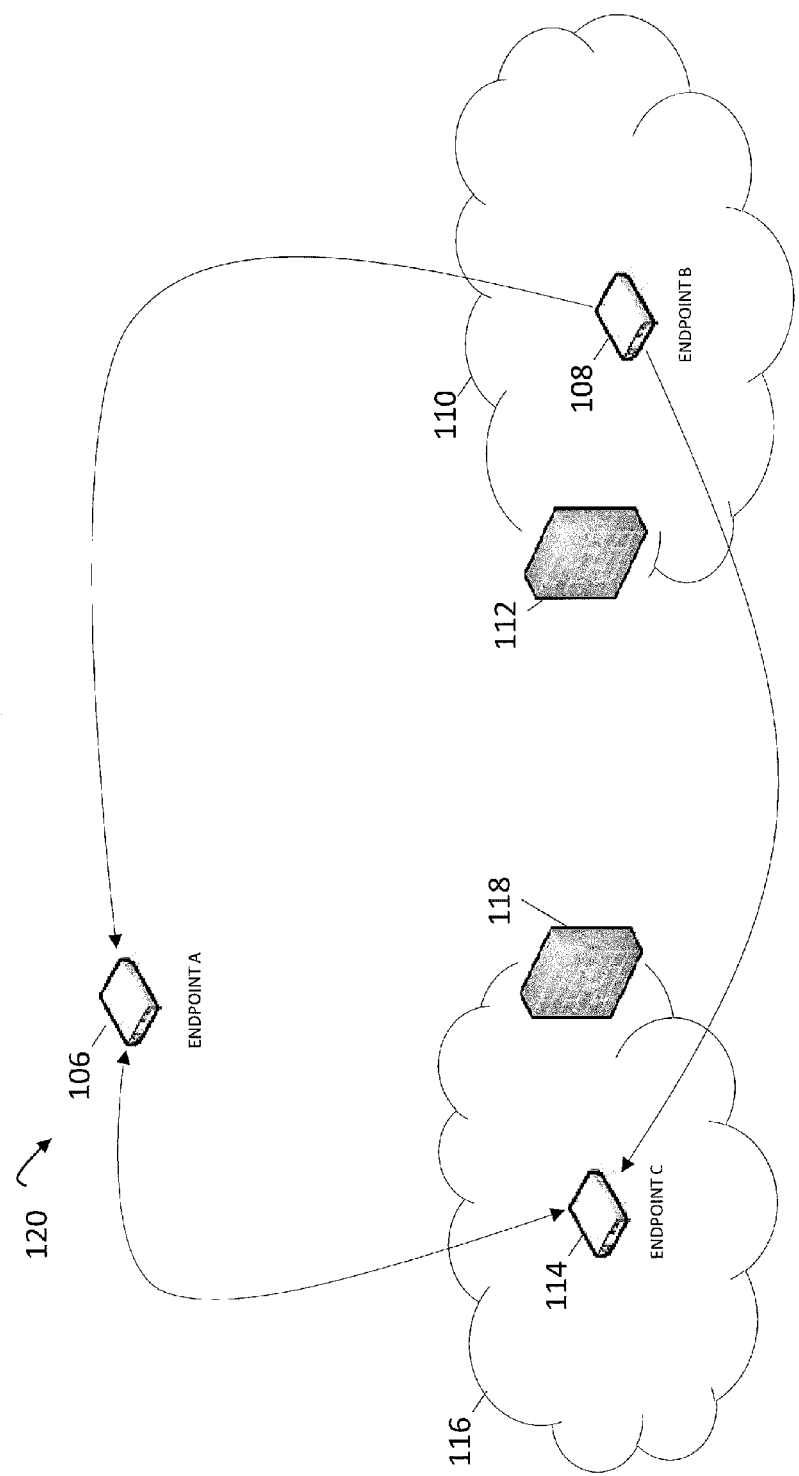
FIG. 7 is a diagram illustrating initiating connections between endpoints hosted in different network types according to an embodiment of the subject matter described herein.

FIG. 7 is a diagram illustrating test connection setup for endpoints in varying network locations according to an embodiment of the subject matter described herein. In some embodiments, after receiving a requested resolved endpoint hostname and associated IP address regarding a first endpoint, requesting entity 600 can instruct the first endpoint or a second endpoint to initiate a test connection.

Referring to FIG. 7, endpoints A-C (e.g., 106, 108, 114) are illustrated and correspond to endpoints A-C described previously. As illustrated in FIG. 1, endpoint A 106 is hosted in a public network 120, endpoint B 108 is hosted in a private or enterprise network 110 behind a security device 112, and endpoint C 114 is hosted in a semi-public or cloud network 116 behind a security device 118. Depending on the network location of each endpoint in the test connection, requesting entity 600 may be configured to instruct only the endpoint capable of initiating the connection to initiate the connection, even if the test traffic will flow from the other endpoint.

In a first example, a test connection between endpoint A 106 and endpoint B 108 may be desired. To that effect, requesting entity 600 may transmit a request message to RM 102 that includes requests to resolve the hostname of both endpoint A 106 and endpoint B 108. RM 102 can be configured to resolve the hostname of each endpoint with the associated IP address (see, e.g., FIG. 6) and transmit a response message back to requesting entity 600, or a second endpoint or node, that includes the resolved hostname (e.g., associated IP address and network location) of both endpoint A 106 and endpoint B 108. Thus, prior to instructing either endpoint to initiate a connection, requesting entity may determine that endpoint A 106 is hosted in public network 120, while endpoint B 108 is hosted in private network 110 behind security device 112. Since security device 112 may prevent any test connection initiation attempts from endpoints outside private network 110, in order for a test connection to be initiated between endpoint A 106 and endpoint B 108, endpoint B 108 must be the endpoint to initiate the connection. In this example, regardless of how the test traffic (e.g., TCP or UDP packets) will flow between the endpoints, requesting entity 600 may need to instruct endpoint B 108 to initiate a test connection with endpoint A 106.

Likewise, in another example, a test connection between endpoint B 108 and endpoint C 114 may be desired. To that effect, requesting entity 600 may transmit a request message to RM 102 that includes requests to resolve the hostname of both endpoint B 108 and endpoint C 114. RM 102 can be configured to resolve the hostname of each endpoint with the associated IP address (see, e.g., FIG. 6) and transmit a response message back to requesting entity 600, or a second endpoint or node, that includes the resolved hostname (e.g., associated IP address and network location) of both endpoint B 108 and endpoint C 114. Thus, prior to instructing either endpoint to initiate a connection, requesting entity may determine that endpoint B 108 is hosted in a private network 110, while endpoint C 114 is hosted in a semi-public or cloud network 116 behind security device 118. Since security device 112 may prevent any test connection initiation attempts from endpoints outside private network 110, in order for a test connection to be initiated between endpoint B 108 and endpoint C 114, endpoint B 108 must be the endpoint to initiate the connection. In this example, regardless of how the test traffic (e.g., TCP or UDP packets) will flow between the endpoints, requesting entity 600 may need to instruct endpoint B 108 to initiate a test connection with endpoint C 114 using the associated IP address (e.g., second IP address associated with security related device 118) of endpoint C 114.

Additionally, in an example where a test connection between endpoint B 108 and an endpoint D (not shown) is desired, where endpoint D is also hosted in private network 110, requesting entity 600 may transmit a request message to RM 102 that includes requests to resolve the hostname of both endpoint B 108 and endpoint D. RM 102 can be configured to resolve the hostname of each endpoint with the associated IP address (see, e.g., FIG. 6) and transmit a response message back to requesting entity 600, or a second endpoint or node, that includes the resolved hostname (e.g., associated IP address and network location) of both endpoint B 108 and endpoint D. Thus, prior to instructing either endpoint to initiate a connection, requesting entity may determine that both endpoint B and D are hosted in private network 110. Since both endpoint B 108 and endpoint D are hosted in private network 110, either endpoint may initiate the connection to the other endpoint. In this example, requesting entity 600 may instruct the endpoint from which traffic will flow to be the endpoint initiating the test connection; although either endpoint may be instructed to initiate a connection.

In another example, a test connection between endpoint A 106 and endpoint C 114 may be desired. To that effect, requesting entity 600 may transmit a request message to RM 102 that includes requests to resolve the hostname of both endpoint A 106 and endpoint C 114. RM 102 can be configured to resolve the hostname of each endpoint with the associated IP address (see, e.g., FIG. 6) and transmit a response message back to requesting entity 600, or a second endpoint or node, that includes the resolved hostname (e.g., associated IP address and network location) of both endpoint A 106 and endpoint C 114. Thus, prior to instructing either endpoint to initiate a connection, requesting entity 600 may determine that endpoint A 106 is hosted in a public network 120, while endpoint C 114 is hosted in a semi-public or cloud network 116 behind a security device 118. Since endpoint A 106 is hosted in a public network, endpoint C 114 can initiate a connection to endpoint A 106 using the associated IP address (e.g., either the first or second IP address associated with endpoint A 106).

Conversely, in order for endpoint A 106 to initiate a connection with endpoint C 114, endpoint A 106 must initiate the connection to endpoint C 114 using the associated IP address (e.g., the second IP address associated with security related device 118). Based on the architecture illustrated in FIG. 4 (e.g., step 5, FIG. 4), RM 102 may be configured to associate endpoint C 114 with the second IP address or the IP address associated with security related device 118. Thus, when RM 102 transmits a response message back to requesting entity 600, the response message will contain the associated IP address that enables an endpoint outside of semi-public or cloud network 116 to initiate a connection with endpoint C 114.

Figure 8:
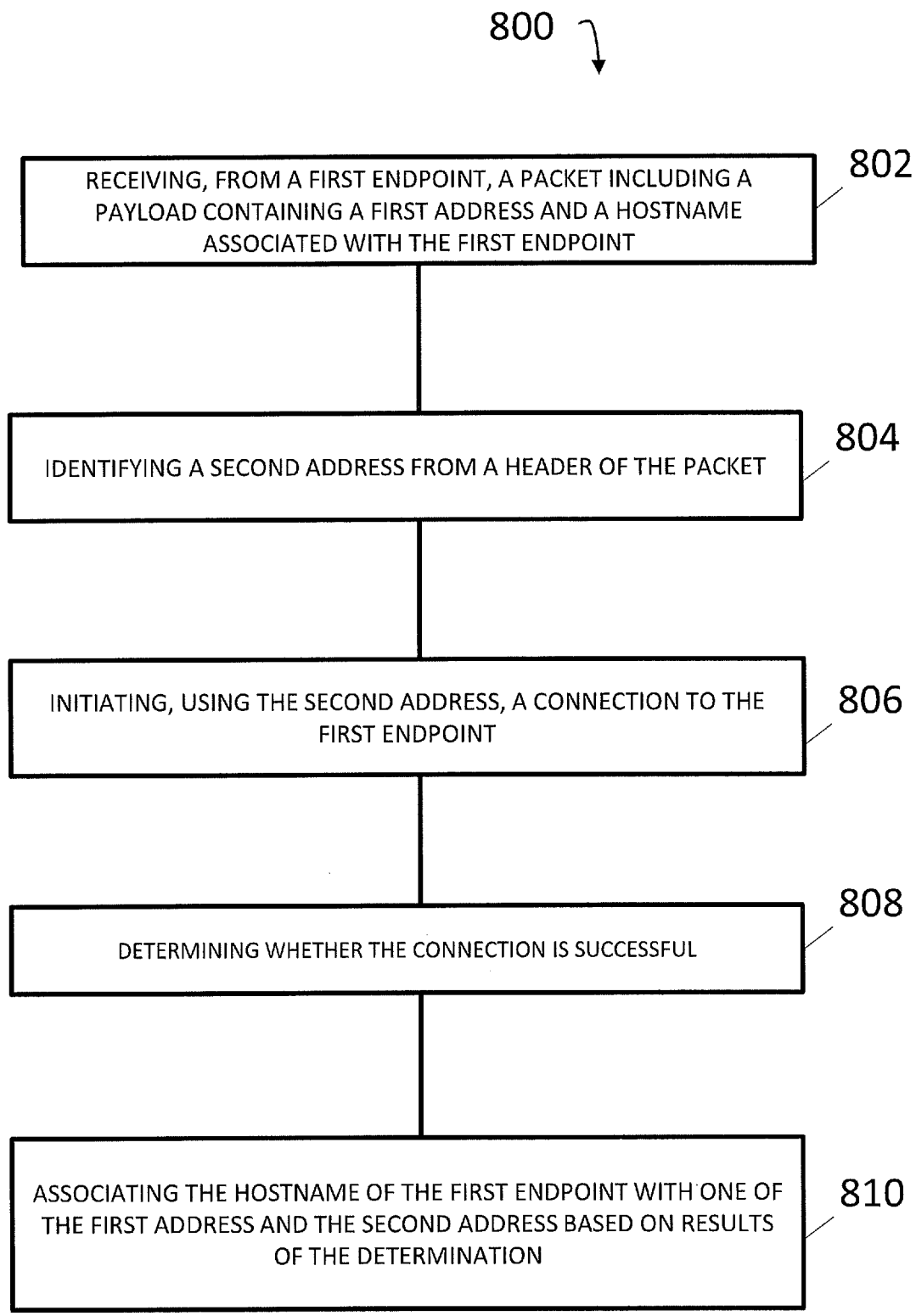
FIG. 8 is a process flow illustrating an exemplary process for registering an endpoint hostname according to an embodiment of the subject matter described herein.

FIG. 8 is a diagram illustrating an exemplary process 800 for facilitating the resolving of endpoint hostnames according to an embodiment of the subject matter described herein. In some embodiments, the exemplary process, or portions thereof, may be performed by or at computing platform 100, RM 102, and/or another node or module. In some embodiments, exemplary process 800 may include steps 802, 804, 806, 808, and/or 810.

Referring to process 800, in step 802, a packet including a payload containing a first address and a hostname associated with a first endpoint may be received at a registration server including at least one processor configured to operate in a public network. For example, an endpoint may transmit a registration request (e.g., a registration message or a TCP Keep-Alive message) in the form of a packet. A payload of the packet may contain an Internet protocol address and a hostname of the endpoint that is inserted by the endpoint into an IP payload of the packet, to a registration module (RM) 102. The endpoint may also include a second address in a packet header. That comprises a source IP address either inserted by the first endpoint or by a NAT into an IP header of the packet. Notably, the packet may be in the form of a TCP or UDP packet.

In some embodiments, the local IP address and the hostname associated with the endpoint may be preconfigured by a user or may be retrieved by the endpoint, although the specifics of this retrieval are outside the scope of the present subject matter, In some embodiments, RM 102 may extract the local IP address (e.g., TCP/IP address) and the hostname associated with the endpoint from the payload of the packet.

In step 804, a second address may be identified from a header of the packet. For example, RM 102 may receive the endpoint in step 802 and may infer and/or identify a source IP address from the packet header.

In step 806, a connection to the endpoint may be initiated using the second address obtained from the IP packet header. For example, RM 102 may initiate a connection attempt with the endpoint using the source IP address from the IP packet header. In this example, RM 102 may send a connection request (e.g., a TCP SYN message) addressed to the source IP address identified in the packet header of the endpoint.

In step 808, the connection may be determined as successful or unsuccessful. For example, after the RM 102 sends a connection request message to the endpoint, the endpoint may either receive and accept the connection request or prevent the connection request. In this example, a success of the connection depends on a network location of the endpoint. Depending on the network location of the endpoint, the endpoint may receive and accept the connection request and transmit a connection response message back.

In some embodiments, if the endpoint receives and accepts the connection request, the endpoint may send a connection response message (e.g., a TCP-ACK message) back to RM 102.

In some embodiments, the endpoint may prevent the connection request if the endpoint is behind a firewall and/or NAT device of a private network.

In step 810, the hostname of the endpoint may be associated with one of the first address and the second address is based on results of the determination (i.e., step 808). For example, RM 102 may associate either the IP address (e.g., first address) or the source IP address (e.g., second address) with the hostname associated with the endpoint based on a determination of whether the connection is successful.

In some embodiments, the first address may be compared to the second address if the connection to the endpoint is successful. For example, if RM 102 receives a connection response message (e.g., a TCP-ACK message) back from the endpoint after RM 102 has sent a connection initiation message (e.g., a TCP-SYN message), then RM 102 may proceed with comparing the packet payload IP address (e.g., first address) of the endpoint with the packet header IP address (e.g., second address).

In this example, if the comparison between the first address and the second address of the endpoint results in a determination that the first address and the second address of the endpoint are different, then the hostname of the endpoint may be associated with the second address or packet header address.

Alternatively, in this example, if the comparison between the first address and the second address of the endpoint results in a determination that the first address and the second address of the endpoint are identical, then the hostname of the endpoint may be associated with either the second address or first address.

In some embodiments, if the connection to the endpoint is unsuccessful then the hostname of the endpoint may be associated with the first address. For example, if the endpoint rejects a registration request message from RM 102, then RM 102 may associate the hostname of the endpoint with a first IP address because the endpoint is behind a security device that has prevented the connection initiation attempt from RM 102.

In some embodiments, a network location of a machine hosting the endpoint may be determined based off of the success of the connection with the endpoint and whether the first address and the second address are different or identical. For example, RM 102 may determine a network location of the endpoint using the information provided in steps 808 and 810. In this example, if the connection attempt is unsuccessful, RM 102 may determine that a network location of the endpoint is behind a security device in a private or enterprise network.

Alternatively, in this example, if the connection attempt is successful, RM 102 may then look at whether the comparison of the first address and the second address resulted in a determination that the two addresses were similar or identical. In particular, if the two addresses are identical, RM 102 may determine that a network location of the endpoint is public, while if the two addresses are different, RM 102 may determine that a network location of the endpoint is semi-public or in a cloud network.

In some embodiments, after associating the hostname of the endpoint with either the first or the second address, a requesting entity may communicate with the registration server to resolve the hostname of the endpoint to the associated address in order to instruct either the endpoint or a second endpoint to initiate a test connection between itself and the other endpoint. For example, a requesting entity 600 may send a request message to RM 102, the request message containing a request to resolve the hostname of the endpoint to the associated address. RM 102 may then resolve the hostname of the endpoint to the associated address and transmit back to requesting entity 600 a response message containing the address associated with the hostname of the endpoint. Subsequently, requesting entity 600 may instruct the endpoint or a second endpoint to initiate a test connection. Alternatively, RM 102 may transmit back to a second endpoint a response message containing the address associated with the hostname of the other endpoint in order to allow the second endpoint to initiate a test connection with the first endpoint.

In some embodiments, initiating a test connection between the first endpoint and the second endpoint comprises transmitting test packets from the second endpoint to the first endpoint using the address associated with the first endpoint.

In some embodiments, the hostname, address associated with the endpoint, and a network location of a machine hosting the endpoint may be stored in data storage. For example, RM 102 may store the hostname, address, associated with the endpoint, and a network location of a machine hosting the endpoint in data storage in a data structure, e.g., 500, that is accessible by RM 102 as well as other nodes or entities (e.g., requesting entity 600).

It will be appreciated that exemplary process 800 is for illustrative purposes and that different and/or additional actions may be used. It will also be appreciated that various actions described herein may occur in a different order or sequence.

The subject matter described herein for registering a hostname of an endpoint provides endpoint hostnames and their associated IP address to a requesting entity independent of a DNS server or other external tool, and regardless of the endpoint's host machine location; thus enabling test connections from one endpoint to another on a proper route. It should also be noted that a computing platform that implements subject matter described herein may comprise a special purpose computing device (e.g., requesting module executed on a computing platform) usable to register and provide endpoint hostnames and their associated IP address.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for facilitating the resolving of a hostname of an endpoint, the method comprising:
    at a registration server including at least one processor, the registration server configured to operate in a public network:
        receiving, from a first endpoint, a packet including a payload containing a first address and a hostname associated with the first endpoint;
        identifying a second address from a header of the packet;
        initiating, using the second address, a connection to the first endpoint;
        determining whether the connection is successful;
        associating the hostname of the first endpoint with one of the first address and the second address based on results of the determination;
    at a requesting entity separate from the first and second endpoints and the registration server:
        transmitting a request message to the registration server to resolve the hostname of the first endpoint and the hostname of a second endpoint;
        receiving a response from the registration server that includes an indication that the first endpoint is located in a public or semi-public network and an indication that the second endpoint is in a private network; and
        preventing a test connection attempt from the first endpoint to the second endpoint by instructing the second endpoint to initiate a test connection with the first endpoint without instructing the first endpoint to initiate a connection with the second endpoint; and
    transmitting test packets between the first and second endpoints over the test connection.

2. The method of claim 1, comprising comparing the first address to the second address if the connection to the first endpoint is successful.

3. The method of claim 2, wherein if the first address and the second address are different, then associating the hostname of the first endpoint with one of the first address and the second address comprises associating the hostname of the first endpoint with the second address.

4. The method of claim 2, wherein if the first address and the second address are identical, then associating the hostname of the first endpoint with one of the first address and the second address comprises associating the hostname of the first endpoint with either one of the first address or the second address.

5. The method of claim 1, wherein, if the connection to the first endpoint is unsuccessful, then associating the hostname of the first endpoint with one of the first address and the second address comprises associating the hostname of the first endpoint with the first address.

6. The method of claim 1, comprising, at the registration server, storing the hostname of the first endpoint, a network location of a machine hosting the first endpoint, and the address associated with the hostname of the first endpoint.

7. The method of claim 1, wherein the first address contained in the payload of the packet comprises an Internet protocol (IP) address inserted by the first endpoint into an IP payload of the packet, and wherein the second address identified from the header of the packet comprises a source IP address either inserted by the first endpoint or by a network address translator (NAT) into an IP header of the packet.

8. The method of claim 7, comprising extracting the IP address and the hostname associated with the first endpoint from the IP payload of the packet.

9. A system for facilitating the resolving of a hostname of an endpoint, the system comprising:
    at least one processor;
    a registration server implemented by the at least one processor, the registration server configured to operate in a public network, wherein the registration server is configured to:
        receive, from a first endpoint, a packet including a payload containing a first address and a hostname associated with the first endpoint,
        identify a second address from a header of the packet,
        initiate, using the second address, a connection to the first endpoint,
        determine whether the connection is successful, and
        associate the hostname of the first endpoint with one of the first address and the second address based on results of the determination;
    a requesting entity separate from the first and second endpoints and the registration server and configured to:
        transmit a request message to the registration server to resolve the hostname of the first endpoint and the hostname of a second endpoint;
        receive a response from the registration server that includes an indication that the first endpoint is located in a public or semi-public network and an indication that the second endpoint is in a private network; and prevent a test connection attempt from the first endpoint to the second endpoint by instructing the second endpoint to initiate a test connection with the first endpoint without instructing the first endpoint to initiate a connection with the second endpoint; and wherein the first and second endpoints exchange test packets over the test connection.

10. The system of claim 9, wherein the registration server is configured to compare the first address to the second address if the connection to the first endpoint is successful.

11. The system of claim 10, wherein if the first address and the second address are different, then the registration server is configured to associate the hostname of the first endpoint with the second address.

12. The system of claim 10, wherein if the first address and the second address are identical, then the registration server is configured to associate the hostname of the first endpoint with either one of the first address or the second address.

13. The system of claim 9, wherein if the connection to the first endpoint is unsuccessful, then the registration server is configured to associate the hostname of the first endpoint with the first address.

14. The system of claim 9, wherein the registration server is configured to store the hostname of the first endpoint, a network location of a machine hosting the first endpoint, and the address associated with the hostname of the first endpoint.

15. The system of claim 9, wherein the first address contained in the payload of the packet comprises an Internet protocol (IP) address inserted by the first endpoint into an IP payload of the packet, and wherein the second address identified from the header of the packet comprises a source IP address either inserted by the first endpoint or by a network address translator (NAT) into an IP header of the packet.

16. The system of claim 15, wherein the registration server is configured to extract the IP address and the hostname associated with the first endpoint from the IP payload of the packet.

17. A non-transitory computer readable medium comprising computer executable instructions embodied in the computer readable medium that when executed by a processor of a computer perform steps comprising:

at a registration server including at least one processor, the registration server configured to operate in a public network:

receiving, from a first endpoint, a packet including a payload containing a first address and a hostname associated with the first endpoint;

identifying a second address from a header of the packet;

initiating, using the second address, a connection to the first endpoint;

determining whether the connection is successful; and associating the hostname of the first endpoint with one of the first address and the second address based on results of the determination at a requesting entity separate from the first and second endpoints and the registration server:

transmitting a request message to the registration server to resolve the hostname of the first endpoint and the hostname of a second endpoint;

receiving a response from the registration server that includes an indication that the first endpoint is located in a public network and an indication that the second endpoint is in a private network; and preventing a test connection attempt from the first endpoint to the second endpoint by instructing the second endpoint to initiate a test connection with the first endpoint without instructing the first endpoint to initiate a connection with the second endpoint; and transmitting test packets between the first and second endpoints over the test connection.

* * * * *